US008349921B2

(12) United States Patent
Wang et al.

(10) Patent No.: US 8,349,921 B2
(45) Date of Patent: *Jan. 8, 2013

(54) MIXED CELLULOSE ESTER FILMS HAVING +C PLATE AND −A PLATE OPTICAL PROPERTIES

(75) Inventors: Bin Wang, Kingsport, TN (US); Michael Eugene Donelson, Kingsport, TN (US); Marcus David Shelby, Fall Branch, TN (US); James Collins Maine, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/393,922

(22) Filed: Feb. 26, 2009

(65) Prior Publication Data

US 2009/0181232 A1  Jul. 16, 2009

Related U.S. Application Data

(63) Continuation-in-part of application No. 12/196,331, filed on Aug. 22, 2008, and application No. 12/393,922, which is a continuation-in-part of application No. 12/196,333, filed on Aug. 22, 2008.

(60) Provisional application No. 60/957,856, filed on Aug. 24, 2007, provisional application No. 60/978,926, filed on Oct. 10, 2007, provisional application No. 60/978,928, filed on Oct. 10, 2007, provisional application No. 60/957,858, filed on Aug. 24, 2007.

(51) Int. Cl.
*C08G 18/62* (2006.01)
*A61K 9/28* (2006.01)

(52) U.S. Cl. .......................................... 524/40; 524/51

(58) Field of Classification Search .................. 252/182; 524/37, 38, 39, 40, 41, 42, 43, 50, 51; 430/200, 430/253, 271.1, 273.1, 952, 964; 428/352, 428/41.8
See application file for complete search history.

(56) References Cited

U.S. PATENT DOCUMENTS

| | | | |
|---|---|---|---|
| 5,138,474 A | 8/1992 | Arakawa | |
| 5,643,666 A | 7/1997 | Eckart et al. | |
| 5,894,048 A | 4/1999 | Eckart et al. | |
| 5,945,468 A * | 8/1999 | Atkinson et al. | 524/51 |
| 5,958,539 A | 9/1999 | Eckart et al. | |
| 5,998,028 A | 12/1999 | Eckart et al. | |
| 6,025,069 A | 2/2000 | Eckart et al. | |
| 6,140,008 A * | 10/2000 | Hsieh et al. | 430/200 |
| 6,559,912 B2 | 5/2003 | Aminaka | |
| 6,740,370 B2 | 5/2004 | Shibue et al. | |
| 6,937,310 B2 | 8/2005 | Elman et al. | |
| 6,977,275 B2 | 12/2005 | Buchanan et al. | |
| 7,276,546 B2 | 10/2007 | Buchanan et al. | |
| 2003/0020208 A1 | 1/2003 | Tasaka et al. | |
| 2003/0156235 A1 | 8/2003 | Kuzuhara et al. | |
| 2003/0171458 A1 | 9/2003 | Buchanan et al. | |
| 2003/0185774 A1 * | 10/2003 | Dobbs et al. | 424/61 |
| 2005/0142304 A1 | 6/2005 | Kawanishi et al. | |
| 2005/0150426 A1 | 7/2005 | Hashimoto et al. | |
| 2005/0271834 A1 | 12/2005 | Michihata | |
| 2006/0093759 A1 | 5/2006 | Fukagawa | |
| 2006/0222786 A1 * | 10/2006 | Oya et al. | 428/1.31 |
| 2006/0270806 A1 * | 11/2006 | Hale | 525/439 |
| 2007/0088105 A1 | 4/2007 | Shelton et al. | |
| 2007/0092663 A1 * | 4/2007 | Murakami | 428/1.31 |

FOREIGN PATENT DOCUMENTS

| | | | |
|---|---|---|---|
| EP | 1619209 | | 1/2006 |
| EP | 1792918 | * | 6/2006 |
| EP | 1792918 A1 | | 6/2007 |
| JP | 05-005047 | * | 1/1993 |
| JP | 05005047 A | | 1/1993 |
| WO | 2004083253 A1 | | 9/2004 |
| WO | 2006116367 A1 | | 11/2006 |
| WO | 2006127834 A2 | | 11/2006 |

OTHER PUBLICATIONS

Yang, D.K. and Wu, S.T., "Fundamentals of Liquid Crystal Displays," 2006, pp. 208-237, Wiley, New Jersey.
Copending U.S. Appl. No. 12/196,333, filed Aug. 22, 2008, Marcus David Shelby et al.
Notification of Transmittal of the International Search Report and The Written Opinion of the International Searching Authority, or the Declaration, filed Aug. 22, 2008 for co-pending PCT/US2008/009994.
Notification of Transmittal of the International Search Report and The Written Opinion of the International Searching Authority, or the Declaration, filed Aug. 22, 2008 for co-pending PCT/US2008/009999.
Copending U.S. Appl. No. 12/196,331, filed Aug. 22, 2008, Marcus David Shelby et al.
USPTO Office Action dated Oct. 29, 2009 for copending U.S. Appl. No. 12/196,333.
USPTO Office Action dated Oct. 29, 2009 for copending U.S. Appl. No. 12/196,331.
USPTO Office Action dated Jun. 17, 2010 for copending U.S. Appl. No. 12/196,331.
USPTO Office Action dated May 11, 2010 for copending U.S. Appl. No. 12/634,731.
USPTO Office Action dated May 11, 2010 for copending U.S. Appl. No. 12/634,736.
USPTO Office Action dated Jun. 17, 2010 for copending U.S. Appl. No. 12/196,333.

(Continued)

*Primary Examiner* — Ling Choi
*Assistant Examiner* — Monique Peets
(74) *Attorney, Agent, or Firm* — Louis N. Moreno

(57) ABSTRACT

The present invention relates to films made from mixed cellulose esters having low hydroxyl content and certain plasticizers. These films can exhibit +C plate, −A plate, and biaxial Nz behavior, which make them particularly suitable for use in optical applications, such as in liquid crystal displays (LCD) as protective and compensator films.

12 Claims, No Drawings

OTHER PUBLICATIONS

Notification of Transmittal of the International Search Report and The Written Opinion of the International Searching Authority, or the Declaration, with Date of Mailing Jun. 23, 2010, for International Application No. PCT/US2010/000372 filed Feb. 11, 2010.

USPTO Office Action dated Jan. 6, 2011 for copending U.S. Appl. No. 12/634,736.

USPTO Office Action dated Jan. 14, 2011 for copending U.S. Appl. No. 12/196,333.

USPTO Office Action dated Jan. 18, 2011 for copending U.S. Appl. No. 12/196,331.

USPTO Office Action dated Jan. 21, 2011 for copending U.S. Appl. No. 12/634,731.

USPTO Office Action dated Jun. 23, 2011 for copending U.S. Appl. No. 12/196,331.

USPTO Office Action dated Jun. 23, 2011 for copending U.S. Appl. No. 12/196,333.

USPTO Office Action dated Jun. 24, 2011 for copending U.S. Appl. No. 12/634,736.

USPTO Office Action dated Jun. 28, 2011 for copending U.S. Appl. No. 12/634,731.

USPTO Office Action dated Feb. 29, 2012 for copending U.S. Appl. No. 12/196,333.

USPTO Office Action dated Jun. 14, 2012 for copending U.S. Appl. No. 12/196,331.

USPTO Office Action dated Jun. 21, 2012 for copending U.S. Appl. No. 12/634,731.

USPTO Office Action dated Jun. 28, 2012 for copending U.S. Appl. No. 12/634,736.

* cited by examiner

US 8,349,921 B2

MIXED CELLULOSE ESTER FILMS HAVING +C PLATE AND −A PLATE OPTICAL PROPERTIES

CROSS-REFERENCE TO RELATED APPLICATION

This application is a continuation-in-part of application Ser. No. 12/196,331, filed on Aug. 22, 2008; and application Ser. No. 12/196,333, filed on Aug. 22, 2008. Both the '331 and '333 applications claim priority under 35 U.S.C. §119(e) to U.S. Provisional Patent Application Nos. 60/957,858, filed on Aug. 24, 2007; 60/978,928, filed on Oct. 10, 2007; 60/957,856, filed on Aug. 24, 2007; and 60/978,926, filed on Oct. 10, 2007. The entire content of all of these applications is hereby incorporated by reference.

FIELD OF THE INVENTION

The present invention relates to films made from mixed cellulose esters having low hydroxyl content and certain plasticizers. These films can exhibit +C plate, −A plate, and biaxial Nz behavior, which make them particularly suitable for use in optical applications, such as in liquid crystal displays (LCD) as protective and compensator films.

BACKGROUND OF THE INVENTION

Cellulose esters such as cellulose triacetate (CTA), cellulose acetate propionate (CAP), and cellulose acetate butyrate (CAB), are used in a wide variety of films by the liquid crystal display (LCD) industry. Most notable is their use as protective and compensator films in conjunction with polarizer sheets. These films are typically made by solvent casting, and then are laminated to either side of an oriented, iodinated polyvinyl alcohol (PVOH) polarizing film to protect the PVOH layer against scratching and moisture ingress, while also increasing structural rigidity. Alternatively, as in the case of compensator films, they can be laminated with the polarizer stack or otherwise included between the polarizer and liquid crystal layers. Cellulose esters have many performance advantages over other materials that see use in display films such as cycloolefins, polycarbonates, polyimides, etc. However, optical birefringence requirements currently often dictate that the latter materials be used instead.

In addition to serving a protective role, these films also play a role in improving the contrast ratio, wide viewing angle, and color shift performance of the LCD. For a typical set of crossed polarizers used in an LCD, there is significant light leakage along the diagonals (leading to a poor contrast ratio), particularly as the viewing angle is increased. It is known that various combinations of optical films can be used to correct or "compensate" for this light leakage. These films must have certain well-defined birefringences (or retardations) that vary depending on the type of liquid crystal cell used, since the liquid crystal cell itself will also impart a certain degree of undesirable optical retardation that must be corrected. Some of these compensator films are easier to make than others, so compromises are often made between performance and cost. Also, while most of the compensator and protective films are made by solvent casting, there is a push to make more films by melt extrusion.

Compensator and optical films are commonly quantified in terms of birefringence which is related to the refractive index n. The refractive index is typically in the range of 1.4 to 1.8 for polymers in general, and approximately 1.46 to 1.50 for cellulose esters. For a given material, the higher the refractive index, the slower the speed of light propagating through it.

For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of interest denoted as $n_x$, $n_y$, and $n_z$, which correspond to the machine direction (MD), the transverse direction (TD), and the thickness direction, respectively. As the material becomes more anisotropic (e.g., by stretching it), the difference between any two refractive indices will increase. This difference is referred to as the "birefringence."

Because there are many combinations of material directions to choose from, there are correspondingly different values of birefringence. The two that are the most common, namely the planar birefringence $\Delta_e$ and the thickness birefringence $\Delta_{th}$, are defined as:

$$\Delta_e = n_x - n_y \quad (1a)$$

$$\Delta_{th} = n_z - (n_x + n_y)/2 \quad (1b)$$

The birefringence $\Delta_e$ is a measure of the relative in-plane orientation between the MD and TD directions and is dimensionless. In contrast, $\Delta_{th}$ gives a measure of the orientation of the thickness direction, relative to the average planar orientation.

Another term often used to characterize optical films is the optical retardation (R). R is simply the birefringence times the thickness (d) of the film in question. Thus, $$R_e = \Delta_e d = (n_x - n_y)d \quad (2a)$$

$$R_{th} = \Delta_{th} d = [n_z - (n_x + n_y)/2]d \quad (2b)$$

Retardation is a direct measure of the relative phase shift between the two orthogonal optical waves and is typically reported in units of nanometers (nm). Note that the definition of $R_{th}$ varies with some authors particularly with regard to the +/− sign.

The birefringence/retardation behavior of materials is also known to vary. For example, most materials when stretched, will exhibit a higher refractive index along the stretch direction and a lower refractive index perpendicular to the stretch direction. This follows because, on a molecular level, the refractive index is typically higher along the polymer chain's axis and lower perpendicular to the chain. These materials are commonly termed "positively birefringent" and represent most standard polymers including all commercial cellulose esters.

Another useful parameter is the "intrinsic birefringence," which is a property of the material and is a measure of the birefringence that would occur if the material were fully stretched with all chains perfectly aligned in one direction.

There are two other much rarer classes of materials, namely "negative birefringent" and "zero birefringent." Negative birefringent polymers exhibit a higher refractive index perpendicular to the stretch direction (relative to the parallel direction), and consequently also have a negative intrinsic birefringence. Certain styrenics and acrylics are known to have negative birefringent behavior due to their rather bulky side groups. Zero birefringence, in contrast, is a special case and represents materials that show no birefringence with stretching and thus have a zero intrinsic birefringence. Such materials are ideal for optical applications as they can be molded, stretched, or otherwise stressed during processing without showing any optical retardation or distortion. Such materials are also extremely rare.

The actual compensator films that are used in an LCD can take on a variety of forms including biaxial films where all three refractive indices differ and two optical axes exist, and uniaxial films having only one optical axis where two of the three refractive indices are the same. There are also other classes of compensator films where the optical axes twist or tilt through the thickness of the film (e.g., discotic films), but these are of lesser importance to understanding the present invention. The important point is that the type of compensator film that can be made is limited by the birefringence characteristics of the polymer (i.e., positive or negative).

In the case of uniaxial films, a film having refractive indices such that $$n_x > n_y = n_z \quad (3a)$$

is denoted as a "+A" plate. In these films, the x direction of the film has a high refractive index while the y and thickness directions are approximately equal in magnitude (and lower than $n_x$). This type of film is also referred to as a positive uniaxial crystal structure with the optic axis along the x-direction. Such films are easy to make by uniaxially stretching a positively birefringent material, using, for example, a film drafter.

In contrast, a "−A" plate uniaxial film is defined as $$n_x < n_y = n_z \quad (3b)$$

where the x-axis refractive index is lower than the other directions (which are approximately equal). The most common method for making a −A plate is to stretch a negative birefringent polymer, or alternatively, by coating a negatively birefringent liquid crystal polymer onto a surface such that the molecules are lined up in a preferred direction.

Another class of uniaxial optical film is the C plate, which can also be "+C" or "−C." The difference between a C plate and an A plate is that in the former, the unique refractive index (or optical axis) is in the thickness direction as opposed to in the plane of the film. Thus, $$n_z > n_y = n_x \text{ ("+C" plate)} \quad (4a)$$

$$n_z < n_y = n_x \text{ ("−C" plate)} \quad (4b)$$

C-plates can be made by biaxial stretching if the relative stretch in the x and y directions is held constant. Alternatively, they can be made by compression forming. Compressing or equibiaxially stretching an initially isotropic, positive intrinsic birefringent material will result in a −C plate since the effective orientation direction is in the plane of the film. Conversely, a +C plate can be made by compressing or equibiaxially stretching an initially isotropic film made with negative intrinsic birefringent material. In the case of biaxial stretching, if the orientation level is not kept the same in the MD and TD directions, then the material is no longer a true C-plate, but instead is a biaxial film with 2 optical axes.

A third, and more common option for producing C-plates takes advantage of the stresses that form during solvent casting of a film. Tensile stresses are created in the plane of the film due to the restraint imposed by the casting belt, which are also equi-biaxial in nature. These tend to align the chains in the plane of the film resulting in −C or +C films for positive and negative intrinsic birefringent materials, respectively. As most cellulose ester films used in displays are solvent cast, and all are essentially positive birefringent, it is apparent that solvent cast cellulose esters normally only produce −C plates. These films can also be uniaxially stretched to produce +A plates (assuming the initial as-cast retardation is very low), but the ability to make +C or −A plates with cellulose esters is extremely limited.

Besides uniaxial plates, it is also possible to use biaxial oriented films. Biaxial films are quantified in a variety of ways including simply listing the 3 refractive indices in the principal directions (along with the direction of these principal axes). Alternatively, biaxial films are often quantified in terms of the parameter Nz, where Nz is defined as $$Nz = (n_x - n_z)/(n_x - n_y) \quad (5)$$

Nz is a measure of the effective out-of-plane birefringence relative to the in-plane birefringence and is typically chosen to be about 0.5 when the film is used as a compensator film for a pair of crossed polarizers. In the case when Nz=1, this biaxial film converts to either a +A plate or a −A plate. By optimizing the stretching condition, a certain Nz value biaxial film can be obtained from a cellulose based +C plate.

In order for compensator films to properly eliminate light leakage, they must be combined in certain ways depending on the type of liquid crystal cell used. For example, *Fundamentals of Liquid Crystal Displays* (D. K. Yang and S. T. Wu, Wiley, N.J., 2006, pp 208-237) describes various ways to compensate for IPS (in-plane switching), twisted nematic (TN), and VA (vertical alignment) type cells using combinations of uniaxial plates (biaxial plates are also effective but are more complicated mathematically). In the case of an IPS cell, a +C plate followed by a +A plate is described (also described is +A followed by +C). When sandwiched between the crossed polarizers, these films effectively correct for light leakage. Another type of structure is where a +A plate is used with a −A plate, which gives a more symmetric viewing angle performance than the +A/+C combination. U.S. Pat. No. 5,138,474 cites the use of +A and −A films together as compensators for TN and super twisted nematic (STN) cells where the +A film is made by stretching polycarbonate and the −A plate is made by stretching negative birefringent polystyrene.

VA compensated films are similar, although the liquid crystal layer itself acts as a +C structure, which has to be figured into the calculation (unlike IPS systems where the cell is typically more "neutral"). The end result is that a +A film in conjunction with a −C film is required. This structure can be made solely with positive birefringent materials. However, improved performance is shown if a 3-layer compensator composed of a +A, −A, and −C film, which once again requires a negative birefringent material for the −A layer. Note that the structures described above are just a few of many combinations available and are only meant to illustrate the importance of positive and negative birefringence. Other compensators (e.g., biaxial films and twisted films) are also possibilities that can benefit from having negative intrinsic birefringence.

The $R_{th}$ values of solvent-cast cellulose triacetate films range from about −20 to −70 nm, but with mixed ester systems, we have observed ranges from about −20 to −300 nm depending on the type of cellulose ester involved (which determines its intrinsic birefringence), the time left on the casting belt (which controls the residual stress in the film), and the type of plasticizers and additives used. Note that by "mixed ester," we are referring to cellulose esters having more than one ester type such as, for example, cellulose acetate propionate (CAP) or cellulose acetate butyrate (CAB). It is fairly common to add retardation additives or inhibitors to the solvent dope to help raise or lower the as-cast retardation. The amount of retardation in the −C plate can also be enhanced by biaxial stretching or compression. Other films such as a +A plate can be made by subsequent uniaxial stretching, assuming the retardation of the −C film is low initially.

Of note, however, is that −A and +C compensator plates cannot be easily made with cellulose esters because of their positive birefringent nature. Thus, other more costly (or poorer performing) materials have to be used instead.

Currently, commercial films exhibiting +C plate behavior are made using a nematic liquid crystal coating with a subsequent polymerization process. The coating process and liquid crystal material, however, are very expensive and require an additional processing step of coating a film to achieve the desired properties. There are no commercial films exhibiting high +C behavior based on cellulose ester and additives.

Thus, there is a need in the art for films exhibiting +C plate behavior without using a liquid crystal material and without requiring an additional coating step.

SUMMARY OF THE INVENTION

It has been surprisingly discovered that a high +C plate film can be made by using low hydroxyl cellulose esters and certain plasticizers in a solvent casting process. A film having −A plate behavior can be made by uniaxially stretching the cellulosic +C plate film at certain stretching conditions. A film having a desired Nz value can also be made by biaxially stretching the cellulosic +C plate film at certain stretching conditions. Both +C and −A plates can be used separately to compensate polarizer light leakage or together in an IPS mode liquid crystal display.

In one embodiment, the invention provides a film made from a composition comprising:
(a) a mixed cellulose ester having:
  (i) at least one acetyl group and at least one non-acetyl group,
  (ii) a ratio of the degree of substitution of non-acetyl groups to the degree of substitution of hydroxyl groups of 10 or greater, and
  (iii) a non-acetyl degree of substitution of 1.1 to 1.75; and
(b) a plasticizer selected from xylitol pentaacetate (XPA), xylitol pentapropionate (XPP), arabitol pentapropionate (APP), triphenyl phosphate (TPP), a polyester comprising succinic acid residues and diethylene glycol residues, and a polyester comprising adipic acid residues and diethylene glycol residues. The film has an optical retardation value in the thickness direction ($R_{th}$) of +50 to +130 nm measured at a film thickness of 80 μm or less and at a light wavelength of 633 nm.

DETAILED DESCRIPTION OF THE INVENTION

According to the present invention, there is provided a film made from a composition comprising:
(a) a mixed cellulose ester having:
  (i) at least one acetyl group and at least one non-acetyl group,
  (ii) a ratio of the degree of substitution of non-acetyl groups to the degree of substitution of hydroxyl groups of 10 or greater, and
  (iii) a non-acetyl degree of substitution of 1.1 to 1.75; and
(b) a plasticizer selected from xylitol pentaacetate (XPA), xylitol pentapropionate (XPP), arabitol pentapropionate (APP), triphenyl phosphate (TPP), a polyester comprising succinic acid residues and diethylene glycol residues, and a polyester comprising adipic acid residues and diethylene glycol residues,
wherein the film has an optical retardation value in the thickness direction ($R_{th}$) of +50 to +130 nm measured at a film thickness of 80 μm or less and at a light wavelength of 633 nm.

In one embodiment, the film has an $R_{th}$ value in the range of +50 to +115 nm. In another embodiment, the film has an $R_{th}$ value in the range of +70 to +115 nm. Other $R_{th}$ value ranges, within these general ranges, are also contemplated within the scope of this invention.

The thickness of the film according to the present invention can vary depending on the application. Generally, for LCD applications, for example, the film thickness can range from 40 to 100 μm.

The cellulose esters of the present invention contain at least two ester types, for example, acetyl, propionyl, and/or butyryl, but longer chain groups can also be used. The mixed cellulose esters have a ratio of the degree of substitution of non-acetyl groups (for example, propionyl and/or butyryl) to the degree of substitution of hydroxyl groups of 10 or greater, for example, 10 to 200. The mixed cellulose esters also have a degree of non-acetyl ester substitution (e.g., propionyl (Pr) plus butyryl (Bu) groups) of greater than 0.5, for example, 1.1 to 1.75.

In one embodiment of the invention, acetyl is the primary ester forming group. In another embodiment, the mixed cellulose ester is a cellulose acetate propionate (CAP). In another embodiment, the mixed cellulose ester is a cellulose acetate butyrate (CAB). In another embodiment, the mixed cellulose ester is a cellulose acetate propionate butyrate (CAPB). In another embodiment, the cellulose ester is a blend of two or more esters chosen from CAP, CAB, and CAPB. In another embodiment, the cellulose ester is a mixed cellulose ester of acetate and at least one ester residue of an acid chain having more than 4 carbon atoms, such as, for example, pentanoyl or hexanoyl. Such higher acid chain ester residues may include, but are not limited to, for example acid chains esters with 5, 6, 7, 8, 9, 10, 11, and 12 carbon atoms. They may also include acid chain esters with more than 12 carbon atoms. In another embodiment of the invention, the mixed cellulose acetate ester that comprises at least one ester residue of an acid chain having more than 4 carbon atoms may also comprise propionyl and/or butyryl groups.

In one embodiment, the mixed cellulose ester of the present invention has a total degree of substitution (DS) of from 2.8 to 3 (i.e., the hydroxyl DS is between 0 and 0.2). In another embodiment, the total degree of substitution is from 2.83 to 2.98, and in yet another embodiment, the total degree of substitution is from 2.85 to 2.95.

The plasticizers according to the invention are selected from xylitol pentaacetate (XPA), xylitol pentapropionate (XPP), arabitol pentapropionate (APP), triphenyl phosphate (TPP), a polyester comprising succinic acid residues and diethylene glycol residues such as Resoflex R-804, and a polyester comprising adipic acid residues and diethylene glycol residues such as Resoflex R-296.

The amount of plasticizer in the composition can vary, depending on the particular plasticizer used, the annealing conditions employed, and the level of $R_{th}$ desired. Generally, the plasticizer may be present in the composition in an amount ranging from 2.5 to 25 weight percent based on the total weight of the mixed cellulose ester and the plasticizer. The plasticizer may also be present in the composition in an amount ranging from 10 to 25 weight percent. The plasticizer may also be present in the composition in an amount ranging from 10 to 20 weight percent. The plasticizer may also be present in the composition in an amount ranging from 10 to 15 weight percent.

In addition to plasticizers, the compositions of the invention may also contain additives such as stabilizers, UV absorbers, antiblocking agents, slip agents, lubricants, pinning agents, dyes, pigments, retardation modifiers, matteing agents, mold release agents, etc.

The compositions of the invention can be made into films by various techniques such as solution casting.

Solvent casting equipment can include a casting belt, roll, or drum.

After casting, the film can be dried and annealed in a forced air oven for 10 minutes at 100° C. After annealing at 100° C., the film can then be annealed at a higher temperature (e.g., 120° C., 130° C., 140° C., or 150° C.) for up to 20 minutes. The primary purpose of the annealing process is to increase the diffusion of residual solvents that might remain in the film from the casting process. However, an additional benefit of annealing is the relaxation of residual stresses that developed during the casting process. As the film adheres to the casting substrate, the solvents evaporate to the open surface creating internal stresses in the film. These stresses depend on material properties, solvent mix, adhesion to the substrate, and solvent evaporation rate. Casting methods and rates can lead to higher stresses, higher birefringence, and higher retardation. Relaxing these process-induced stresses is desirable for dimensional stability and low retardation, +C type films.

These annealing times and temperatures can vary, depending on the casting technique used. For example, if a continuous solvent casting line is used instead of a batch process in a laboratory, lower annealing temperatures and shorter times may be used.

If desired, the film can be stretched in the MD direction by, for example, traditional drafting or combined compression/drawing type drafters. Stretching in the TD is typically performed by tentering. Likewise, a combination of MD and TD stretching can be used if desired. Stretching is usually applied to impart a specific birefringence to the film for use in, for example, compensator films. Actual stretching conditions and configurations are well known in the art. For example, film stretching in multiple directions can be simultaneous or sequential depending on the equipment available. Most stretching operations involve stretch ratios of 1.1 to 5× in one or more directions (although this can vary with material). Furthermore, most stretching also involves a follow up annealing or "heatsetting" step to further condition the material.

The film can be post treated with methods well known in the art such as corona treatment, plasma treatment, flame treatment, etc. The film is also commonly saponified to ensure good adhesion with subsequent PVOH polarizing layers.

For liquid crystal display applications, the film will ultimately be combined with other films and structures to form an overall liquid crystal device. Examples of processes used include lamination and/or coating. These structures are commonly known to those skilled in the art, and it is understood that the films of the present invention can be used in a variety of forms depending on the specifics of the particular manufacturer and liquid crystal cell type.

This invention can be further illustrated by the following working examples, although it should be understood that these examples are included merely for purposes of illustration and are not intended to limit the scope of the invention.

EXAMPLES

Measurement Procedures

The degree of substitution (DS) of the mixed cellulose esters was determined by $^1$H NMR using a JEOL Model 600 NMR spectrometer operated at 600 MHz. The sample tube size was 5 mm, and the sample temperature was 80° C. The pulse delay was 5 seconds and 64 scans were acquired for each experiment.

The weight percentages of acetyl and propionyl were determined by a hydrolysis GC method. In this method, about 1 g of ester was weighed into a weighing bottle and dried in a vacuum oven at 105° C. for at least 30 minutes. Then, 0.500 g (+/−0.001) of sample was weighed into a 250 mL Erlenmeyer flask, and to this flask was added 50 mL of a solution of 9.16 g isovaleric acid (99% purity) in 2000 mL of pyridine. This mixture was heated to reflux for about 10 minutes after which 30 mL of a methanoic potassium hydroxide solution was added. This mixture was heated at reflux for about 10 minutes. The mixture was allowed to cool with stirring for 20 minutes and then 3 mL of concentrated hydrochloric acid was added. The mixture was stirred for 5 minutes and then allowed to settle for 5 minutes. About 3 mL of the solution was transferred to a centrifuge tube and centrifuged for about 5 minutes. The solution was analyzed by GC (split injection and flame ionization detector) with a 25M×0.53 mm fused silica column with 1 micron FFAP phase. The weight percent of acyl was calculated according to the following formula:

$$Ci=((Fi*Ai)/Fs*As))*R(100)$$

where:
 Ci=concentration of acyl group
 Fi=relative response factor for component
 Fs=relative response factor for isovaleric acid
 Ai=area of component I
 As=area of isovaleric acid
 R=(grams of isovaleric acid)/(g of sample)

Inherent viscosity (IV) was determined using a concentration of 0.5 g/100 mL of resin in a 60/40 (wt/wt) mixture of phenol/tetrachloroethane at 25° C.

Optical retardations $R_e$ and $R_{th}$ of the films were measured using a Woollam ellipsometer M-2000V at a wavelength of 633 nm.

Mixed Cellulose Ester Preparation Procedure

The mixed cellulose ester according to the invention and used in the following examples can be prepared by the following procedure.

Fluff cellulose in a metal laboratory blender. Treat the fluffed cellulose according to one of the following four pretreatment steps.

Pretreatment A: Soak the fluffed cellulose in a mixture of acetic acid and propionic acid.

Pretreatment B: Soak the fluffed cellulose in water for about 1 hour. Filter and wash the wet pulp four times with acetic acid to yield acetic acid wet pulp.

Pretreatment C: Soak the fluffed cellulose in water for about 1 hour. Filter and wash the wet pulp four times with propionic acid to yield propionic acid wet pulp.

Pretreatment D: Soak the fluffed cellulose in water for about 1 hour. Filter and wash the wet pulp three times with acetic acid and three times with propionic acid to yield propionic acid wet pulp.

Place the acid wet pulp from one of the pretreatments above in a reaction kettle and add acetic or propionic acid. Cool the reaction mass to 15° C. and add a 10° C. solution of acetic anhydride, propionic anhydride, and sulfuric acid. After the initial exotherm, hold the reaction mixture at about 25° C. for 30 minutes and then heat the reaction mixture to 60° C. When the mixture has doped out and the proper viscosity of the dope has been obtained, add a 50-60° C. solution of acetic acid and water. Allow the mixture to stir for 30 minutes and then add a solution of magnesium acetate tetrahydrate in acetic acid and water. Precipitate the reaction mixture using one of the following methods.

Precipitation Method A: Add water to precipitate the reaction mixture. Filter and wash the resulting slurry with water for about four hours, and then dry the precipitate in a 60° C. forced air oven to obtain the cellulose acetate propionate.

Precipitation Method B: Add 10% acetic acid to precipitate the reaction mixture and then add water to harden the precipitate. Filter and wash the resulting slurry with water for about four hours. Dry the precipitate in a 60° C. forced air oven to obtain the cellulose acetate propionate.

Solvent Casting Procedure

Solvent casting of the films was performed according to the following procedure. First, 24 grams of solids (resin+plasticizer) were added to 176 grams of a 85/14/1 wt % solvent mixture of methylene chloride/methanol/n-butanol. The 24 grams of solids contained 10 wt %, 12.5 wt %, 15 wt %, or 20 wt % of the plasticizer. The mixture was sealed, placed on a roller, and mixed for 24 hours to create a uniform dope. After mixing, the dope was cast onto a glass plate using a doctor blade to obtain a film with the desired thickness.

Casting was conducted in a fume hood with relative humidity controlled at 50%, although this was found to vary slightly depending on when the film was cast.

After casting, the film and glass were allowed to dry for one hour under a cover pan (to minimize rate of solvent evaporation). After this initial drying, the film was peeled from the glass and annealed in a forced air oven for 10 minutes at 100° C. After annealing at 100° C., the film was annealed at a higher temperature (either 120, 130, 140, or 150° C.) for 20 minutes.

Example 1

Films were prepared with the following particulars using the Solvent Casting Procedure described above.

| Total solids: | 24 g |
|---|---|
| Cellulose ester: | Low hydroxyl CAP (Hydroxyl DS = 0.09, Acetyl DS = 1.46, Propionyl DS = 1.45) |
| Plasticizer: | Resoflex 804 |
| Plasticizer level: | 10, 12.5, 15, and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 1. The thickness of each film was 80 μm.

TABLE 1

| | Annealing Temp (° C.) | | | |
|---|---|---|---|---|
| PZ level (wt %) | 120 | 130 | 140 | 150 |
| 10.00 | 19.71 | 22.20 | 24.67 | 31.94 |
| 12.50 | 22.92 | 27.03 | 30.13 | 35.40 |
| 15.00 | 26.23 | 29.36 | 33.55 | 44.26 |
| 20.00 | 34.71 | 36.99 | 56.42 | 77.60 |

Example 2

Films were prepared with the following particulars using the Solvent Casting Procedure described above.

| Total solids: | 24 g |
|---|---|
| Cellulose ester: | Low hydroxyl CAP (Hydroxyl DS = 0.09, Acetyl DS = 1.46, Propionyl DS = 1.45) |
| Plasticizer: | Xylitol Pentaacetate (XPA) |
| Plasticizer level: | 10, 12.5, 15, and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 2. The thickness of each film was 80 μm.

TABLE 2

| | Annealing Temp (° C.) | | | |
|---|---|---|---|---|
| PZ level (wt %) | 120 | 130 | 140 | 150 |
| 10.00 | 24.64 | 28.53 | 27.46 | 49.47 |
| 12.50 | 30.68 | 33.83 | 35.52 | 89.01 |
| 15.00 | 33.75 | 38.80 | 45.16 | 103.46 |
| 20.00 | 40.59 | 60.95 | 89.24 | 113.43 |

Example 3

Films were prepared with the following particulars using the Solvent Casting Procedure described above.

| Total solids: | 24 g |
|---|---|
| Cellulose ester: | Low hydroxyl CAP (Hydroxyl DS = 0.09, Acetyl DS = 1.46, Propionyl DS = 1.45) |
| Plasticizer: | Xylitol Pentapropionate (XPP) |
| Plasticizer level: | 10, 12.5, 15, and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 3. The thickness of each film was 80 μm.

TABLE 3

| | Annealing Temp (° C.) | | | |
|---|---|---|---|---|
| PZ level (wt %) | 120 | 130 | 140 | 150 |
| 10.00 | 20.31 | 23.57 | 25.37 | 36.53 |
| 12.50 | 22.56 | 28.01 | 33.61 | 56.78 |
| 15.00 | 23.95 | 32.43 | 40.80 | 83.86 |
| 20.00 | 33.94 | 44.85 | 69.32 | 103.77 |

Example 4

Films were prepared with the following particulars using the Solvent Casting Procedure described above.

| Total solids: | 24 g |
|---|---|
| Cellulose ester: | Low hydroxyl CAP (Hydroxyl DS = 0.09, Acetyl DS = 1.46, Propionyl DS = 1.45) |

-continued

| Plasticizer: | Arabitol Pentapropionate (APP) |
|---|---|
| Plasticizer level: | 10, 12.5, 15, and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 4. The thickness of each film was 80 μm.

TABLE 4

| | Annealing Temp (° C.) | | | |
|---|---|---|---|---|
| PZ level (wt %) | 120 | 130 | 140 | 150 |
| 10.00 | 21.52 | 22.72 | 26.41 | 30.63 |
| 12.50 | 27.70 | 29.59 | 35.24 | 51.21 |
| 15.00 | 33.46 | 35.36 | 59.52 | 93.83 |
| 20.00 | 35.57 | 38.72 | 73.38 | 94.53 |

Example 5

Films were prepared with the following particulars using the Solvent Casting Procedure described above.

| Total solids: | 24 g |
|---|---|
| Cellulose ester: | Low hydroxyl CAP (Hydroxyl DS = 0.06, Acetyl DS = 1.50, Propionyl DS = 1.44) |
| Plasticizer: | Triphenyl phosphate (TPP) |
| Plasticizer level: | 10 and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 5. The thickness of each film was 80 μm.

TABLE 5

| | Annealing Temp (° C.) | | | |
|---|---|---|---|---|
| PZ level (wt %) | 120 | 130 | 140 | 150 |
| 10.00 | −14.58 | −8.31 | −0.49 | 21.89 |
| 20.00 | −7.14 | 32.98 | 67.56 | 89.27 |

Example 6

Films were prepared with the following particulars using the Solvent Casting Procedure described above.

| Total solids: | 24 g |
|---|---|
| Cellulose ester: | Low hydroxyl CAP (Hydroxyl DS = 0.06, Acetyl DS = 1.50, Propionyl DS = 1.44) |
| Plasticizer: | Resoflex 296 |
| Plasticizer level: | 10 and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different annealing temperatures and plasticizer (PZ) concentrations is reported in Table 6. The thickness of each film was 80 μm.

TABLE 6

| | Annealing Temp (° C.) | | | |
|---|---|---|---|---|
| PZ level (wt %) | 120 | 130 | 140 | 150 |
| 10.00 | 14.62 | 17.59 | 19.03 | 23.53 |
| 20.00 | 27.05 | 31.04 | 33.29 | 51.90 |

Example 7

Films were prepared with the following particulars using the Solvent Casting Procedure described above, except that all films were annealed at 130° C.

| Total solids: | 24 g |
|---|---|
| Cellulose ester: | Low hydroxyl CAP (Hydroxyl DS = 0.09, Acetyl DS = 1.46, Propionyl DS = 1.45) |
| Plasticizer: | Xylitol Pentaacetate (XPA) |
| Plasticizer level: | 10, 12.5, 15, and 20 wt % of total solids |
| Total solvent: | 176 g |
| Methylene chloride: | 149.6 g |
| Methanol: | 24.64 g |
| n-Butanol: | 1.76 g |

The optical retardation value $R_{th}$ of each film at different thicknesses and plasticizer (PZ) concentrations is reported in Table 7.

TABLE 7

| | Thickness (μm) | | |
|---|---|---|---|
| PZ level (wt %) | 40 | 60 | 80 |
| 10.00 | 13.53 | 21.70 | 28.53 |
| 12.50 | 16.38 | 25.42 | 33.83 |
| 15.00 | 17.19 | 28.63 | 38.80 |
| 20.00 | 24.69 | 42.04 | 60.95 |

Example 8

Films were prepared with the following particulars using the Solvent Casting Procedure described above.

| Total solids: | 24 g |
|---|---|
| Cellulose ester: | Low hydroxyl CAP (Hydroxyl DS = 0.09, Acetyl DS = 1.46, Propionyl DS = 1.45) |
| Plasticizer: | XPA & XPP |
| Plasticizer level: | 15 and 20 wt % of total solids |
| Total solvent: | 176 g |
| Methylene chloride: | 149.6 g |
| Methanol: | 24.64 g |
| n-Butanol: | 1.76 g |

After these films were cast, they were uniaxially stretched at 165° C. at different stretch ratios. Most of the stretched films possess the property of a biaxial Nz film. A couple of the films have the optical property close to a −A plate, where $R_{th}=-Re/2$. The Re, Rth, and thickness of these stretched films were measured. The results are shown in Table 8.

TABLE 8

| Plasticizer | | Stretch Temp. (° C.) | Stretch Ratio | $R_e$ (nm) | $R_{th}$ (nm) | Film Thickness (μm) |
|---|---|---|---|---|---|---|
| XPA | 15% | 165 | 1 × 1.60 | −70.93 | 43.11 | 74.00 |
| XPA | 15% | 165 | 1 × 1.70 | −74.77 | 43.66 | 70.00 |
| XPA | 15% | 165 | 1 × 1.70 | −94.22 | 55.80 | 76.00 |
| XPA | 15% | 165 | 1 × 1.75 | −95.24 | 54.56 | 74.00 |
| XPP | 15% | 165 | 1 × 1.70 | −88.60 | 54.72 | 92.00 |
| XPP | 15% | 165 | 1 × 1.75 | −72.92 | 42.51 | 78.00 |
| XPP | 15% | 165 | 1 × 1.70 | −92.94 | 56.47 | 76.00 |
| XPP | 15% | 165 | 1 × 1.75 | −105.98 | 64.85 | 82.00 |
| XPA | 15% | 165 | 1 × 1.70 | −85.91 | 50.78 | 80.00 |
| XPA | 15% | 165 | 1 × 1.75 | −77.11 | 48.49 | 80.00 |
| XPA | 20% | 165 | 1 × 1.70 | −68.94 | 46.22 | 72.00 |
| XPA | 20% | 165 | 1 × 1.75 | −82.23 | 49.18 | 74.00 |

The invention has been described in detail with particular reference to preferred embodiments thereof, but it will be understood that variations and modifications can be effected within the spirit and scope of the invention.

We claim:

1. An optical film made from a composition comprising:
   (a) a mixed cellulose ester having:
      (i) at least one acetyl group and at least one non-acetyl ester group,
      (ii) a ratio of the degree of substitution of non-acetyl ester groups to the degree of substitution of hydroxyl groups of 10 or greater, and
      (iii) a non-acetyl ester degree of substitution of 1.1 to 1.75; and
   (b) a plasticizer selected from the group consisting of xylitol pentaacetate (XPA), xylitol pentapropionate (XPP), arabitol pentapropionate (APP), a polyester comprising succinic acid residues and diethylene glycol residues, and a polyester comprising adipic acid residues and diethylene glycol residues,
   wherein the film has an optical retardation value in the thickness direction ($R_{th}$) of +50 to +130 nm measured at a film thickness of 80 μm or less and at a light wavelength of 633 nm.

2. The film according to claim 1, wherein the plasticizer is XPA.

3. The film according to claim 1, wherein the plasticizer is XPP.

4. The film according to claim 1, wherein the plasticizer is APP.

5. The film according to claim 1, wherein the plasticizer is a polyester comprising succinic acid residues and diethylene glycol residues.

6. The film according to claim 1, wherein the plasticizer is a polyester comprising adipic acid residues and diethylene glycol residues.

7. The film according to claim 1, wherein the $R_{th}$ value ranges from +70 to +115 nm.

8. The film according to claim 1, wherein the mixed cellulose ester is cellulose acetate propionate.

9. The film according to claim 1, which has been stretched.

10. The film according to claim 8, which has a −A plate optical property.

11. The film according to claim 1, which has been solution cast.

12. The film according to claim 1, wherein the $R_{th}$ value ranges from +50 to +115 nm.

* * * * *